(12) United States Patent
Hackl et al.

(10) Patent No.: US 10,563,287 B2
(45) Date of Patent: Feb. 18, 2020

(54) LEACHING COPPER-CONTAINING ORES

(71) Applicant: Technological Resources Pty. Limited, Melbourne (AU)

(72) Inventors: Ralph Peter Hackl, Mount Eliza (AU); Paul Leslie Brown, Kiama (AU); Stephen Charles Grocott, North Warrandyte (AU); Daniel Arthur Kittelty, Pascoe Vale (AU)

(73) Assignee: Technological Resources Pty. Limited, Melbourne, Victoria (AU)

( * ) Notice: Subject to any disclaimer, the term of this patent is extended or adjusted under 35 U.S.C. 154(b) by 0 days.

(21) Appl. No.: 16/230,150

(22) Filed: Dec. 21, 2018

(65) Prior Publication Data

US 2019/0127822 A1 May 2, 2019

Related U.S. Application Data

(63) Continuation of application No. PCT/AU2018/050316, filed on Apr. 6, 2018.

(30) Foreign Application Priority Data

Apr. 6, 2017 (AU) ................................ 2017901263
Sep. 20, 2017 (AU) ................................ 2017903824

(51) Int. Cl.
| | | |
|---|---|---|
| *C22B 15/00* | (2006.01) | |
| *C22B 3/18* | (2006.01) | |
| *C22B 3/06* | (2006.01) | |
| *C22B 1/14* | (2006.01) | |

(52) U.S. Cl.
CPC ............ *C22B 15/0067* (2013.01); *C22B 1/14* (2013.01); *C22B 3/06* (2013.01); *C22B 3/18* (2013.01); *C22B 15/0065* (2013.01); *C22B 15/0069* (2013.01)

(58) Field of Classification Search
CPC .... C22B 1/14; C22B 3/06; C22B 3/18; C22B 15/0065; C22B 15/0067; C22B 15/0069
See application file for complete search history.

(56) References Cited

U.S. PATENT DOCUMENTS

| | | | |
|---|---|---|---|
| 3,260,593 A | | 7/1966 | Zimmerley et al. |
| 3,475,163 A | | 10/1969 | Watson et al. |
| 3,856,913 A | * | 12/1974 | McElroy ............ B01D 11/0288 |
| | | | 423/106 |
| 4,571,387 A | | 2/1986 | Bruynesteyn et al. |
| 5,074,993 A | | 12/1991 | Kerr et al. |

(Continued)

FOREIGN PATENT DOCUMENTS

| | | |
|---|---|---|
| AU | 78560/98 A | 2/1999 |
| AU | 749366 B2 | 6/2002 |

(Continued)

OTHER PUBLICATIONS

CN 107164633 machine translation. (Year: 2017).*

(Continued)

*Primary Examiner* — Tima M. McGuthry-Banks
(74) *Attorney, Agent, or Firm* — Banner & Witcoff, Ltd.

(57) ABSTRACT

A method of leaching copper-containing ores, such as chalcopyrite ores, with a leach liquor in the presence of silver and an activation agent that activates silver whereby the silver enhances copper extraction from copper ores.

29 Claims, 4 Drawing Sheets

(56) References Cited

U.S. PATENT DOCUMENTS

| | | | |
|---|---|---|---|
| 5,411,148 | A | 5/1995 | Kelebek et al. |
| 5,462,720 | A | 10/1995 | Aragones |
| 6,277,341 | B1 | 8/2001 | Pinches et al. |
| 7,004,326 | B1 | 2/2006 | Dai et al. |
| 7,846,233 | B2 | 12/2010 | Dixon et al. |
| 8,795,612 | B2 | 8/2014 | Dixon et al. |
| 2010/0018349 | A1 | 1/2010 | Manabe |
| 2015/0211092 | A1 | 7/2015 | Chaiko |
| 2015/0361523 | A1 | 12/2015 | Schuffer Ameller |
| 2016/0258036 | A1 | 9/2016 | Rautenbach |
| 2016/0298248 | A1 | 10/2016 | Hymer |

FOREIGN PATENT DOCUMENTS

| | | | |
|---|---|---|---|
| CN | 107164633 | * | 9/2017 |
| WO | 98/08585 A1 | | 3/1998 |
| WO | WO 0037690 | * | 6/2000 |
| WO | 02/099144 A1 | | 12/2002 |
| WO | 2012/031317 A1 | | 3/2012 |
| WO | 2014/205481 A1 | | 12/2014 |
| WO | 2015/081372 A2 | | 6/2015 |

OTHER PUBLICATIONS

Lu, ZY.; M.I. Jeffrey & F. Lawson. "The effect of chloride ions on the dissolution of chalcopyrite in acidic solutions." Hydrometallurgy 56 pp. 189-202. (Year: 2000).*
May 17, 2018—International Search Report and Written Opinion of the International Searching Authority in PCT/AU2018/050316.
Feb. 22, 2019—(WO) International Preliminary Report on Patentability—App PCT/AU2018/050316.
Dec. 3, 2018—Response to Written Opinion—App PCT/AU2018/050316.
Jan. 23, 2017—International Search Report and Written Opinion of PCT/AU2016/051024.
Nov. 26, 2015—International-Type Search Report of AU 2015904452.
Mar. 22, 2019—(CL) Opposition to Patent Application—App 201803313.
Zhigang Yin et al., "Separation of Molybdenite from Chalcopyrite in the Presence of Novel Depressant 4-Amino-3-thioxo-3,4-dihydro-1,2,4-triazin-5(2H)-one", Minerals 2007, vol. 7, No. 8: 146.
Herreros, O., et al. "Leaching of Copper Concentrates Using NaCL and Soluble Copper Contributed by the Concentrate Itself", Rev. Metal Madrid 41 (2005), pp. 384-392.
Feb. 14, 2018—International Preliminary Report on Patentability of PCT/AU2016/051024.
Cordoba, E.M. et al., "Comparative kinetic study of the silver-catalyzed chalcopyrite leaching at 35 and 68° C", International Journal of Mineral Processing, vol. 92, No. 3-4, 2009 pp. 137-143.
Hiroyoshi, N., et al., "A new reaction model for the catalytic effect of silver ions on chalcopyrite leaching in sulfuric acid solutions", Hydrometallurgy, vol. 63, No. 3, 2002, pp. 257-467.
Munoz, J.A., et al., "Silver catalyzed bioleaching of low-grade copper ores. Part III: Column reactors" < Hydrometallurgy, vol. 88, No. 1-4, 2007, pp. 35-51.
Srinath, E.G., et al., "Bacterial Leaching of Copper from Low Grade Chalcopyrite Ores." Journal of the Indian Institute of Science. vol. 58, No. 12, pp. 567-576 (Year: 1976).
Jun. 20, 2018—(AU) International-Type Search Report and Written Opinion—Australian App 2018901583.
May 20, 2019—(WO) International Search Report and Written Opinion—App PCT/AU2019/050383.
Chen, Yu-Wei; Yuerong Li, Mei-Fang Cai, Nelson Belzile & Zhi Dang, "Preventing oxidation of iron sulfide materials by polyethylene polyamines." Minerals Engineering 19, pp. 19-27 (Year: 2006).
Jager, Michael et al., "Branched and linear poly(ethylene imine)-based conjugates: synthetic modification, characterization, and application", Chem. Soc. Rev., 2012, 41, pp. 4755-4767.
Watling, H.R., "The bioleaching of sulphide minerals with emphasis on copper sulphides—A review." Hydrometallurgy 84, pp. 81-108 (Year: 2006).
May 25, 2017—(AU) International Type Search Report—App 2017901263.
Ahonen, et al., "Catalytic effects of silver in the microbiological leaching of finely ground chalcopyrite-containing ore materials in shake flasks", Hydrometallurgy, vol. 24, No. 2, 1990, pp. 219-236.

* cited by examiner

LEACHING COPPER-CONTAINING ORES

CROSS-REFERENCE TO RELATED APPLICATION

This application is a by-pass continuation of PCT/AU2018/050316, filed Apr. 6, 2018, which claims priority to Australian Application 2017901263, filed Apr. 6, 2017, and Australian Application 2017903824, filed Sep. 20, 2017. The present application claims priority to and the benefit of all the above-identified applications, which are all incorporated by reference herein in their entireties.

TECHNICAL FIELD

The present invention relates to leaching copper-containing ores and concentrates of copper-containing ores.

The present invention relates to heap, vat, and tank leaching of copper-containing ores. The ores may be in the form of fragments. The ores may be in the form of agglomerates of fragments.

The present invention relates to heap, vat, and tank leaching of concentrates of copper-containing ores. The ore concentrates may be in any suitable form, including unagglomerated and agglomerated forms.

The present invention relates particularly, although not exclusively, to sulfidic ores and ore concentrates that contain chalcopyrite ($CuFeS_2$), hereinafter referred to as "chalcopyrite ores" and "chalcopyrite ore concentrates", respectively. The chalcopyrite ores and chalcopyrite ore concentrates may contain other copper minerals.

The present invention relates particularly, although not exclusively, to a method of heap leaching agglomerates of fragments of chalcopyrite ores.

The present invention relates particularly, although not exclusively, to a method of bioleaching agglomerates of fragments of chalcopyrite ores in a heap via the use of microorganisms.

BACKGROUND ART

In the conventional heap leaching of copper sulfide containing minerals (including chalcopyrite ores), mined ore is stacked into heaps, aerated through direct injection of air via aeration pipes extending into the heap and/or by natural convection through exposed areas of the heap, and irrigated with an acid solution for extraction of copper into solution. The copper is subsequently recovered from the acid solution by a range of recovery options including solvent extraction and electrowinning (SX/EW), cementation onto more active metals such as iron, hydrogen reduction, and direct electrowinning. The acid solution is regenerated and recycled through the heap to leach more copper from the ore in the heap. The ore in the heap may comprise agglomerates of fragments of ore. Leaching may be assisted by the addition of ferrous and sulfur oxidizing microorganisms.

Generally, heap and dump leaching (hereinafter collectively referred to as "heap leaching") provide lower metal recoveries than other metallurgical process options for recovering copper from copper-containing ores, such as milling and flotation that produces copper-containing concentrates that are then smelted to produce copper metal.

Consequently, heap leaching tends to be reserved for lower grade ore types that have at least a proportion of readily recoverable copper, but where crushing/milling costs per unit of copper (or copper equivalent—i.e. when taking into account by-product credits from, for example, gold and silver) are too high to support a concentrator approach, or where mineral liberation and other characteristics (e.g. arsenic content) will not support production of directly useable or saleable concentrates.

Standard best industry practice is to use agglomerates of mined and thereafter crushed ore fragments in heaps. Typically, the mined ore is processed through multiple crushing steps, namely primary and secondary crushing steps, and in some instances tertiary crushing steps, and the crushed ore fragments are agglomerated in an agglomeration step, typically with the use of an acid.

The invention is concerned particularly with leaching mined and crushed and agglomerated ore fragments that contain chalcopyrite.

It is known that it is difficult to leach more than 20-40 wt. % of the total copper from chalcopyrite by heap leaching. The low copper recovery is often thought to be associated with the formation of a passive film on the surface of chalcopyrite.

International application PCT/AU2016/051024 in the name of the applicant relates to leaching chalcopyrite ores (and other copper-containing ores). The disclosure in the International application is incorporated herein by cross-reference.

An important focus of the International application is heap leaching fragments or agglomerates of fragments of chalcopyrite ores.

The International application describes and claims an invention that is based on a finding of the applicant, through a Group company of the applicant, that it is possible to achieve high (greater than 60 wt. % of the total copper) recovery of copper by leaching agglomerates of (a) fragments of chalcopyrite ores (and other copper-containing ores) and (b) silver.

The International application describes that the agglomerates may be formed by adding silver (a) to mined ore fragments prior to, or during, agglomeration of the ore fragments or (b) to already-formed agglomerates of the ore fragments.

In particular, as reported in the International application, the applicant found that low concentrations of silver, typically less than 2 g silver per kg copper in chalcopyrite ores, dispersed on the surfaces of chalcopyrite in agglomerates makes it possible to achieve higher recoveries (greater than 60 wt. %) of copper from the ores in shorter leaching times compared to leaching agglomerates that do not have silver dispersed in the agglomerates. This is a significant finding, particularly in the context of leaching lower grade chalcopyrite ores, i.e. ores containing less than 1.5 wt. % copper, typically less than 1.25 wt. % copper, and typically less than 1 wt. % copper, and typically less than 0.5 wt. % copper. This is also a significant finding in the context of leaching other lower grade copper-containing ores.

The present invention was made in the course of further research and development work in relation to the invention of the International application.

The present invention makes it possible to achieve higher recoveries of copper from chalcopyrite (and other copper-containing minerals) in ore fragments.

The above description is not to be taken as an admission of the common general knowledge in Australia or elsewhere.

SUMMARY OF THE DISCLOSURE

Testwork conducted by a Group company of the applicant has shown that various activation agents including by way of example complexing agents can be used to activate silver in, or added to, chalcopyrite ores, and hence, enhance the catalytic effect of silver in the leaching of chalcopyrite.

In particular, the testwork has shown that chloride has a synergistic effect with silver in enhancing copper extraction from chalcopyrite-containing copper ores.

The same synergistic effect applies to copper extraction from concentrates of chalcopyrite-containing copper ores.

It is expected that the same synergistic effect applies to other halides, such as iodides and bromides, because of the complexing behaviour of halides.

Another reagent that has been shown in testwork by the applicant to increase chalcopyrite extraction through the activation of silver, is thiourea. It is expected that other complexants, in particular other sulfur-containing ligands, would have the same effect.

The applicant believes that activation occurs via the reagents (a) mobilising silver to the chalcopyrite surface and/or (b) enhancing the reactivity of the silver on the chalcopyrite surface.

More particularly, the applicant found in column and stirred reactor leach tests in the further research and development work that good leach results for agglomerates of (a) fragments of chalcopyrite ores and (b) silver were obtained with leach liquors that contain low concentrations, typically up to 5 g/L, typically up to 4 g/L, typically up to 2.5 g/L, typically up to 1.5 g/L, typically up to 1.25 g/L, more typically up to 1 g/L, of chlorides in the leach liquor.

These results were obtained with lower grade chalcopyrite ores, i.e. ores containing less than 1.5 wt. %, typically less than 1.25 wt. %, typically less than 1 wt. %, copper, and typically less than 0.5 wt. % copper.

The synergistic effect of chlorides and silver is contrary to the expectation of the applicant and the teaching of the literature.

Based on the literature, the applicant had expected to find that chlorides in a leach liquor would tend to precipitate silver as silver chloride before either the silver or the chlorides had a chance to act beneficially in a leach system.

For example, International patent publication WO 00/37690 (UBC) reports that when chlorides are present in a leach liquor, thiosulfate can be added to inhibit the precipitation of silver as silver chloride. For example, page 6, lines 7-10 of WO 00/37690 states that " . . . the present invention recognizes that delivery of catalytic amounts of silver to the ore may be facilitated, where there is chloride in the silver solution, by adding a thiosulfate, such as ammonium thiosulfate, to the silver solution in an amount effective to inhibit the precipitation of the soluble silver as silver chloride". In addition, page 16, lines 17-19 of WO 00/37690 state that "Examples 28-30 (PVD ore) and 32-34 (K ore) demonstrate that the addition of thiosulfate to a silver solution can counteract the effect of the presence of chloride ion in the solution, i.e. counteract the precipitation of silver chloride". Examples 28-30 were conducted with KCl as part of a nutrient medium, with the KCl being present in an amount of 0.15 g/15 L of the medium. In summary, the disclosure in WO 00/37690 indicates that chlorides can be detrimental to the use of silver in leaching fragments of chalcopyrite ores (and ores containing other copper-containing minerals).

By way of further example, Munoz, J. A. et al., "*Silver catalyzed bioleaching of low-grade copper ores*", Part II: Stirred Tank Tests. Hydrometallurgy Vol 88, 2007 pages 19-34, discloses that the benefit of silver addition on copper extraction was inhibited when there was 5 g/L Cl in solution in a leach liquor.

The above-described synergistic effect applies to heap, vat, and tank leaching copper-containing ores that are in the form of fragments or in the form of agglomerates of fragments.

The above-described synergistic effect also applies to heap, vat, and tank leaching concentrates of copper-containing ores. The ore concentrates may be in any suitable form, including unagglomerated and agglomerated forms.

In general terms, the present invention provides a method of leaching copper-containing ores, such as chalcopyrite ores, with a leach liquor in the presence of silver and an activation agent that activates silver such that the silver enhances copper extraction from copper ores.

In general terms, the present invention also provides a method of leaching concentrates of copper-containing ores, such as chalcopyrite ores, with a leach liquor in the presence of silver and an activation agent that activates silver whereby the silver enhances copper extraction from copper ore concentrates.

The method may include any one of:
(a) heap or vat or tank leaching ore fragments,
(b) heap or vat or tank leaching agglomerates of ore fragments,
(c) heap or vat or tank leaching ore concentrates, and
(d) heap or vat or tank leaching agglomerates of ore concentrates.

The present invention provides a method of leaching copper-containing ores, such as chalcopyrite ores, and concentrates of the ores, with the method including leaching copper-containing ores or concentrates of the ores in a heap or in a reactor, such as a vat or a tank, with a leach liquor in the presence of silver and an activation agent that activates silver such that the silver enhances copper extraction.

The activation agent may be any suitable reagent that can activate silver such that the silver enhances copper extraction from chalcopyrite-containing copper ores and ore concentrates.

The activation agent may be any one or more than one of silver-complexing ligands such as chlorides, iodides, bromides, and thiourea.

Although iron is essential for leaching processes, both in the form of pyrite for the generation of heat and ferric ions to oxidise the sulfide minerals in the ores, neither pyrite nor ferric ions are considered "activation agents" in the context of the present invention.

The activation agent may be present in the method by being sprayed or otherwise distributed in a liquid or solid form onto ore fragments or ore concentrates, including before, during or after agglomeration if agglomeration is practiced, or as a component of the leach liquor.

When the activation agent is present in the method as a component of the leach liquor, the method may include providing a selected concentration or concentration range of the activation agent in the leach liquor.

The selected concentration or concentration range of the activation agent in the leach liquor may be the result of any one or more of the following positive steps:
(a) addition of the activation agent to the leach liquor;
(b) removal of the activation agent from the leach liquor;
(c) addition of the activation agent in an agglomeration step;
(d) mixing different ore types having regard to the soluble activation agent in the ores;
(e) selection and blending/mixing of water source/type with regard to activation agent concentration (e.g. use of seawater) in the ores;

(f) other human-intervention into one or more inputs to the leach process that can affect the soluble activation agent concentrations in the leach process.

The selected concentration or concentration range of the activation agent may be different to the background concentrations of the activation agent in the leach liquor, the chalcopyrite ore or concentrate. The invention requires an assessment to be made of the required concentration or concentration range of the activation agent for a given ore or concentrate and to assess the available water source(s) and relevant conditions and control the process, for example having regard to steps (a) to (e) above, so that there is the required concentration or concentration range of the activation agent.

The method may include monitoring the concentration of any one or more than one silver-complexing ligands such as chlorides, iodides, bromides, and thiourea.

The term "chalcopyrite ores" is understood herein to mean ores that contain chalcopyrite. The ores may also contain other copper-containing minerals. The ores may also contain pyrite.

The term "fragment" is understood herein to mean any suitable size of mined or treated (e.g. crushed) material having regard to materials handling and processing capabilities of the apparatus used to carry out the method. It is also noted that the term "fragment" as used herein may be understood by some persons skilled in the art to be better described as "particles". The intention is to use both terms as synonyms.

The term "ore concentrate" is understood herein to mean any concentrated form of an ore formed by any suitable option, such as flotation or other forms on ore beneficiation.

The term "mined" ore is understood herein to include, but is not limited to, (a) run-of-mine material and (b) run-of-mine material that has been subjected to at least primary crushing or similar or further size reduction after the material has been mined. The term "mined" ore also includes mined material that is in stockpiles.

The leaching step may be carried out in the presence of a low concentration or concentration range of the activation agent selected from any one or more than one silver-complexing ligands such as chlorides, iodides, bromides, and thiourea.

The meaning of the term "low concentration" in relation to chlorides, iodides, bromides, thiourea and other silver-complexing ligands will depend in any given situation on a number of factors including mineralogy of the ore, physical characteristics of ore fragments such as the fragment size and particle size distribution, characteristics of agglomerates such as size and porosity, copper concentration in the ore, silver concentration (native in ore fragments and added as part of agglomerates), composition of the leach liquor and, in the case of heap leaching, the characteristics of the heap including heap porosity.

The low concentration of chlorides may be up to 5 g/L, typically up to 4 g/L, typically up to 2.5 g/L, typically up to 1.5 g/L, typically up to 1.25 g/L chlorides, and more typically up to 1 g/L chlorides, in the leach liquor.

The low concentration of chlorides may be greater than 0.2 g/L, typically greater than 0.5 g/L, and more typically greater than 0.8 g/L.

The low concentration of iodides and bromides may be the same as for chlorides.

The low concentration of thiourea may be less than 10 g/L in the leach liquor.

Typically, it is not necessary for the leach liquor to contain thiosulfates or other additives to inhibit the precipitation of silver chlorides, iodides or bromides.

The leach liquor may include microorganisms to assist leaching of copper.

The microorganisms may be one or more than one of mesophilic or thermophilic (moderate or extreme) bacteria or archaea. The microorganisms may be acidophilic bacteria or archaea. The microorganisms may be thermophilic acidophiles.

The method may include adding the activation agent to the leach liquor continuously or periodically during the course of the method to maintain a required concentration during the method.

In a situation where the method recycles, optionally after regenerating, leach liquor from the leach step, the method may include adjusting the concentration of the activation agent in the regenerated leach liquor to maintain the concentration.

Leaching may be any suitable option for leaching agglomerates.

For example, leaching may be vat or tank leaching.

By way of further example, which is of particular interest to the applicant, leaching may be heap leaching.

Heap leaching may include supplying a leach liquor to a heap of agglomerates from the agglomeration step and allowing the leach liquor to flow through the heap and leach copper from agglomerates and collecting leach liquor from the heap, processing the leach liquor and recovering copper from the liquor.

Heap leaching may include controlling the heap temperature to be less than 85° C., typically less than 75° C., typically less than 65° C., typically less than 60° C., typically less than 55° C., typically less than 50° C., and more typically less than 45° C.

Heap leaching may include controlling the heap temperature to be at least 5° C., typically at least 10° C., typically at least 20° C., typically at least 30° C., and more typically at least 40° C.

Heap leaching may include controlling the oxidation potential of the leach liquor during an active leaching phase of the step to be less than 900 mV, typically less than 850 mV, typically less than 700 mV, typically less than 660 mV, typically 600-660 mV, more typically in a range of 630-660 mV, all potentials being with respect to the standard hydrogen electrode. It is noted that the oxidation potential will change during heap leaching and is likely to be higher when much of the copper has been leached and the reference to "active leaching phase" is intended to acknowledge this potential change.

Heap leaching may include controlling the pH of the leach liquor to be less than 3.2, typically less than 3.0, typically less than 2.5, typically less than 2.0, typically less than 1.8, typically less than 1.5, typically less than 1.2, and typically less than 1.0.

Heap leaching may include controlling the pH of the leach liquor to be greater than 0.3, typically greater than 0.5.

Heap leaching may include recovering copper from the leach liquor in downstream copper recovery steps.

The leach liquor may be regenerated and recycled to the heap.

Heap leaching may include adjusting the concentration of the activation agent in the regenerated leach liquor to maintain the concentration.

The concentration adjustment may include adding the activation agent to the regenerated leach liquor to maintain the concentration.

The concentration adjustment may include removing the activation agent from the regenerated leach liquor to maintain the concentration.

The concentration adjustment may include removing the degradation/decomposition products from the regenerated leach liquor to maintain the concentration.

The ores may include copper-containing ores that have naturally occurring silver. Naturally occurring silver in copper-containing ores may or may not have catalyst properties for copper leaching. Naturally-occurring silver may be in one or more of a number of forms in copper-containing ores, including but not limited to native silver, argentite ($Ag_2S$), chlorargyrite (AgCl), as inclusions of silver in copper minerals and pyrite, and as silver sulfosalts such as tetrahedrite ($Cu,Fe,Zn,Ag_{12}Sb_4S_{13}$), pyragyrite ($Ag_3SbS_3$) and proustite ($Ag_3AsS_3$).

Where there is naturally occurring silver that has catalyst properties for copper leaching, an operator may take this into account and select a lower concentration of added silver than would otherwise be the case. By way of example, it may not be necessary to add any silver.

In the case of chalcopyrite ores, the invention relates to dispersing silver in a form and within a defined concentration range on the surface of chalcopyrite.

Typically, the defined concentration range is less than 2 g Ag/kg Cu.

Agglomeration may include forming agglomerates by mixing together ore fragments and silver in an agglomeration step.

Agglomeration may include forming agglomerates by adding silver to ore fragments and then mixing together ore fragments in an agglomeration step.

Agglomeration may include forming agglomerates of ore fragments in an agglomeration step and then adding silver to the agglomerates.

Agglomerates formed in agglomeration may have a low total silver concentration.

As noted above, the fragments in agglomerates may already have a naturally occurring low silver concentration before the addition of silver in agglomeration and some or all of the naturally occurring silver may or may not have catalyst properties for copper leaching. In practice, this is a factor to take into account when determining the amount of silver to add during agglomeration so that the overall active silver concentration remains within a required concentration range. To distinguish between naturally-occurring silver concentrations in chalcopyrite ores and the silver added during the agglomeration step, the added silver is hereinafter referred to as "added silver" or similar terminology.

The added silver and the total silver concentration in agglomerates are expressed herein in terms of g silver per kg copper in the ore in the agglomerates. The required concentration of added silver in agglomeration to achieve a selected agglomerate silver concentration (naturally occurring and added) can readily be determined by the skilled person. In addition, it is acknowledged that there are different measures of silver concentration in the patent and non-patent literature and it can be challenging to make comparisons of the different ranges disclosed in the literature.

The added silver concentration in agglomerates may be less than 5 g silver per kg copper in the ore in agglomerates.

The added silver concentration in agglomerates may be less than 2 g silver per kg copper in the ore in agglomerates.

The added silver concentration in agglomerates may be less than 1 g silver per kg copper in the ore in agglomerates.

The added silver concentration in agglomerates may be less than 0.5 g silver per kg copper in the ore in the agglomerates.

The added silver concentration in agglomerates may be greater than 0.02 g silver per kg copper in the ore in agglomerates.

The added silver concentration in agglomerates may be greater than 0.05 g silver per kg copper in the ore in agglomerates.

The added silver concentration in agglomerates may be greater than 0.1 g silver per kg copper in the ore in agglomerates.

The added silver concentration in agglomerates may be greater than 0.2 g silver per kg copper in the ore in agglomerates.

Agglomeration may include adding silver to the chalcopyrite ore fragments by any suitable means and in any suitable form.

The added silver may be in a solid form.

The added silver may be in a soluble form.

The added silver may be in a solution.

The added silver may be in an aqueous solution.

The added silver may be in a solid form that becomes mobile upon dissolution with leach liquor. It may precipitate or otherwise be deposited on the chalcopyrite surface.

The added silver may be in an insoluble form or sparingly soluble form such as silver sulfate or silver chloride or silver sulfide. The term "sparingly soluble" is understood herein to mean salts with solubility less than 0.05 moles/litre.

Typically, the added silver is added to the ore fragments while the fragments are being mixed together.

Agglomeration may include dispersing added silver on surfaces of chalcopyrite in chalcopyrite ore fragments.

Agglomeration may include dispersing added silver within the chalcopyrite ore fragments.

Agglomeration may include adding silver to the chalcopyrite ore fragments in the form of an aerosol, where the term "aerosol" is understood to mean a colloidal suspension of particles, typically in powder form, in air or gas.

Agglomeration may include adding silver in solution to the chalcopyrite ore fragments in the form of a mist or a spray, where the terms "mist" and "spray" are understood to mean small droplets of silver solution suspended in air.

Typically, agglomeration may include adding silver to the chalcopyrite ore fragments in the form of a mist or a spray or aerosol while the ore fragments are being mixed.

Agglomeration may include adding the activation agent in solid or liquid form to the ore fragments.

Agglomeration may include forming agglomerates by also mixing together an acid, typically sulfuric acid but could also be dilute hydrochloric, with the chalcopyrite ore fragments and the silver. The acid may be added at the same time as, or prior to, or after the silver solution. The added acid dose rate may be less than 100 kg $H_2SO_4$/dry t ore, typically less than 50 kg $H_2SO_4$/dry t ore, typically less than 30 kg $H_2SO_4$/dry t ore, and may be less than 10 kg $H_2SO_4$/dry t ore or less than 5 kg $H_2SO_4$/dry t ore. Typically, the acid dose rate is 0.5-10 kg $H_2SO_4$/dry t ore.

Agglomeration may include forming agglomerates by also mixing together pregnant leach solution or raffinate with the chalcopyrite ore fragments and the silver.

Agglomeration may include forming agglomerates by also mixing microorganisms that can assist leaching of copper with the chalcopyrite ore fragments and the silver. The microorganisms may be added at the same time as, or prior to, or after the silver solution. The microorganisms may be as described above. Specifically, the microorganisms may be one or more than one of mesophilic, thermophilic (moderate or extreme) or psychrotolerant bacteria or archaea. The microorganisms may be acidophilic bacteria or archaea. The microorganisms may be thermophilic acidophiles.

Agglomeration may include simultaneously mixing and agglomerating fragments.

Agglomeration may include mixing fragments in one-step and then agglomerating the mixed fragments in a subsequent step. There may be overlap between the mixing and agglomeration steps.

The fragments of chalcopyrite ores may include fractures to facilitate dispersing silver solution with the fragments.

The method may include reducing the size of the mined ore prior to agglomeration.

By way of example, the method may include crushing the mined ore prior to agglomeration. The mined ore may be crushed using any suitable means.

The method may include crushing mined ore in a primary crushing step prior to agglomeration.

The term "primary crushing" is understood herein to mean crushing ore to a top size of 250 to 150 mm in the case of copper-containing ores where the copper is in the form of sulfides. It is noted that the top size may be different for ores containing different valuable metals.

The method may include crushing mined ore in a primary crushing step and then a secondary and possibly tertiary and possibly quaternary crushing step prior to agglomeration.

The invention also provides a heap of material, with the material including the above-described agglomerates.

The invention also includes a method of heap leaching that includes:

(a) forming a heap of material, with the material including the above-described agglomerates; and (b) leaching valuable metal from the ore in the heap with a leach liquor containing an activation agent that activates silver whereby the silver enhances copper extraction from chalcopyrite-containing copper ores.

Heap leaching may include recovering copper from the leach liquor in downstream copper recovery steps.

The leach liquor may be regenerated and recycled to the heap.

Heap leaching may include adjusting the concentration of the activation agent in the regenerated leach liquor to maintain the concentration.

The concentration adjustment may include adding the activation agent to the regenerated leach liquor to maintain the concentration.

The concentration adjustment may include removing the activation agent from the regenerated leach liquor to maintain the concentration.

The method may also include recovering the leached metal as a metal product. Typically, this step includes recovering the leached metal from solution in pregnant leach liquor.

The method may include forming heaps of the copper-containing ores or concentrates without mixing the ores or concentrates with additional particulate or agglomerated feed materials, such as pyrite.

The invention also provides a method of leaching copper-containing ores, such as chalcopyrite ores, that includes:

(a) crushing mined copper-containing ore in a crusher and forming fragments;

(b) forming agglomerates of ore fragments, silver, an acid, and optionally microorganisms in an agglomeration station;

(c) forming a heap of the agglomerates;

(d) supplying a leach liquor to the heap and collecting leach liquor after it has passed through the heap, with the leach liquor leaching copper from the ore fragments as it passes through the heap;

(e) recovering copper from the leach liquor; and (f) regenerating and recycling the regenerated leach liquor to the heap;

and the method being characterised by leaching copper from fragments in the heap in the presence of an activation agent that activates silver whereby the silver enhances copper extraction.

The method may include providing the leach liquor with a low concentration of the activation agent.

The method may include forming agglomerates with the activation agent.

In general terms, the advantages of the invention provide an opportunity for microorganism-assisted heap leaching silver-containing agglomerates of fragments of chalcopyrite ore fragments, particularly low grade ores (i.e. less than 1.5 wt. % copper), at relatively low heap temperatures at comparatively low operating costs with high recoveries.

BRIEF DESCRIPTION OF THE DRAWING

The present invention is described further with reference to the accompanying Figures, of which.

DESCRIPTION OF EMBODIMENT

The following description is in the context of heap leaching agglomerates of copper-containing ore fragments, with the activation agent being added to the leach liquor. However, it is noted that the invention extends to vat and tank leaching copper-containing ores that are in the form of fragments or in the form of agglomerates of fragments. It is also noted that the invention also extends to heap, vat, and tank leaching concentrates of copper-containing ores, with the ore concentrates being in any suitable form, including unagglomerated and agglomerated forms. It is also noted that the activation agent may be present in the method by any suitable option and the invention is not confined to adding the activation agent to the leach liquor. By way of example, the activation agent may be added in an agglomeration step. By way of example, the activation agent may be sprayed or otherwise distributed in a liquid form onto ore fragments or ore concentrates.

Figure 1:
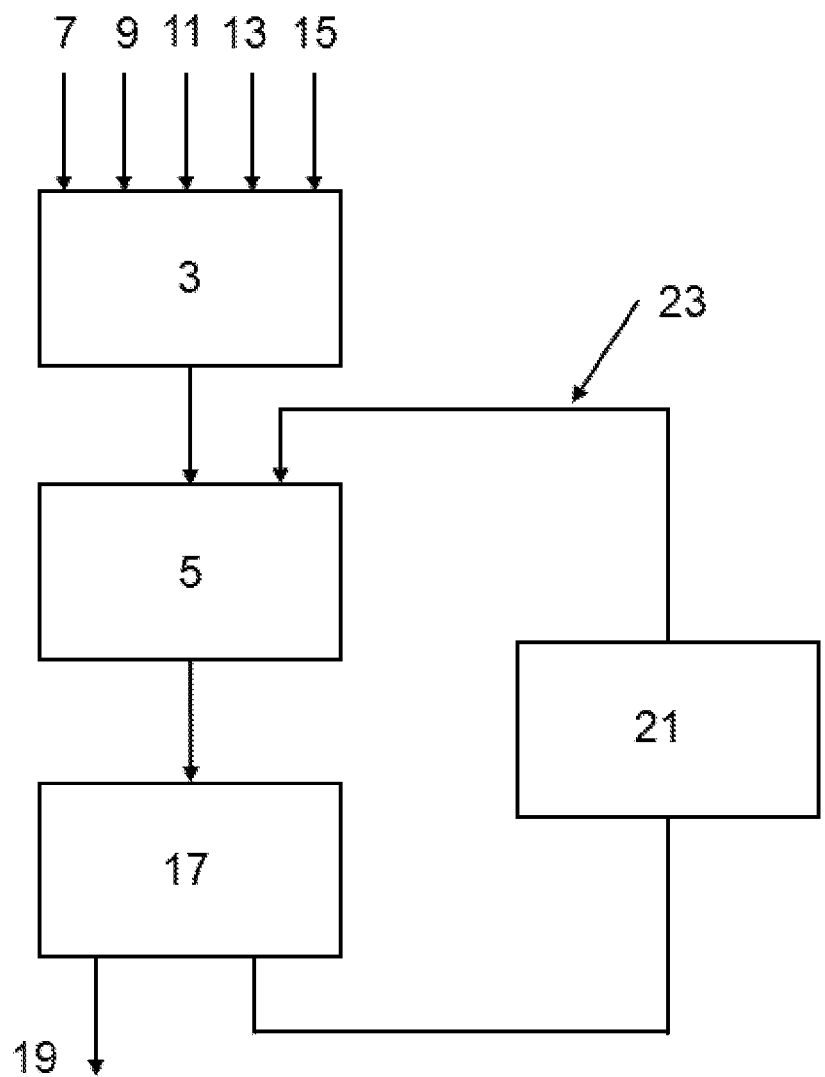
FIG. 1 illustrates the steps in one embodiment of a method of heap leaching agglomerates of fragments of chalcopyrite ores and silver with a leach liquor containing an activation agent, including any one or more than one of chlorides, iodides, bromides, thiourea and other silver-complexing ligands to activate or mobilise silver in accordance with the present invention.

With reference to FIG. 1, the following feed materials are transferred to an agglomeration station 3 and are agglomerated as described below:

(a) fragments of chalcopyrite ore that have been crushed to a suitable particle size distribution, identified by the numeral 7 in the Figure;

(b) silver, in this embodiment as a silver solution (but could be in a solid form), typically having an added concentration of silver of less than 5 g silver per kg copper in the ore in the agglomerates, identified by the numeral 9 in the Figure;

(c) an acid, typically sulfuric acid, identified by the numeral 11 in the Figure in any suitable concentration;

(d) microorganisms, identified by the numeral 13 in the Figure, of any suitable type and in any suitable concentration; and (b) optionally, an activation agent such as silver-complexing ligands including chlorides, iodides, bromides, and thiourea identified by the numeral 15 in the Figure.

The agglomerates produced in the agglomeration station 3 are subsequently used in the construction of a heap 5.

The agglomerates produced in the agglomeration station 3 may be transferred directly to a heap construction site. Alternatively, the agglomerates may be stockpiled and used as required for a heap. The agglomeration station 3 and the heap 5 may be in close proximity. However, equally, the agglomeration station 3 and the heap 5 may not be in close proximity.

The method of agglomerating mined ore fragments illustrated in FIG. 1 is suitable for forming agglomerates that can be used in standard heaps. More specifically, the present invention does not extend to particular shapes and sizes of heaps and to particular methods of constructing heaps from the agglomerates and to particular operating steps of the heap leaching processes for the heaps.

By way of example only, the heap may be a heap of the type described in International publication WO2012/031317 in the name of the applicant and the disclosure of the heap construction and leaching process for the heap in the International publication is incorporated herein by cross-reference.

In a heap leaching operation, copper in the chalcopyrite and other copper-containing minerals in the agglomerates are leached from the agglomerates in the heap 5 via the supply of a leach liquor 23 containing a low concentration, typically up to 5 g/L, typically up to 4 g/L, typically up to 2.5 g/L, typically up to 1.5 g/L, typically up to 1.25 g/L, more typically up to 1 g/L, of any one or more than one activation agent such as silver-complexing ligands including chlorides, iodides, bromides, and thiourea to the leach liquor.

As described above, silver-complexing ligands such as chlorides, iodides, bromides, and thiourea mobilise silver to the chalcopyrite surface and/or enhance the reactivity of the silver on the chalcopyrite surface.

The low concentration of any one or more than one silver-complexing ligands such as chlorides, iodides, bromides, and thiourea may be the result of any one or more of the following positive steps:

(a) addition chlorides, iodides, bromides, and thiourea to the leach liquor, as described above;

(b) removal of chlorides, iodides, bromides, and thiourea from the leach liquor;

(c) addition of chlorides, iodides, bromides, and thiourea in the agglomeration step as described above as an optional step;

(d) mixing different ore types having regard to the soluble chlorides, iodides, bromides, and thiourea s in the ores;

(e) selection and blending/mixing of water source/type regard to the soluble chlorides, iodides, bromides, and thiourea in the ores;

(f) other human-intervention into one or more inputs to the heap leach process that can affect the soluble chlorides, iodides, bromides, and thiourea concentrations in the heap.

The leached copper is recovered from the leach liquor in downstream copper recovery steps 17.

The recovered copper 19 is transferred for further processing and the leach liquor is regenerated in a regeneration circuit 21 and recycled to the heap 5 with make-up leach liquor as may be required as the leach liquor 23.

The chlorides, iodides, bromides, and thiourea may be added to the leach liquor 23 continuously or periodically to maintain the required low concentration in the leach liquor.

The method includes monitoring the concentration of chlorides, iodides, bromides, and thiourea in the leach liquor 23 and adjusting addition rates as may be required to maintain the required low concentration.

The agglomeration station 3 may be any suitable construction that includes a drum, conveyor (or other device) for mixing the feed materials for the agglomerates and agglomerating the feed materials. Mixing and agglomerating the feed materials for the agglomerates may occur simultaneously. Alternatively, mixing the feed materials may be carried out first and agglomerating (for example initiated by the addition of the acid) may be carried out after mixing has been completed to a required extent. Moreover, the timing of adding and then mixing and agglomerating feed materials may be selected to meet the end-use requirements for the agglomerates. For example, it may be preferable in some situations to start mixing fragments of chalcopyrite ores and then adding silver in a solution or in a solid form of silver, acid, and microorganisms progressively in that order at different start and finish times in the agglomeration step. By way of particular example, it may be preferable in some situations to start mixing fragments of chalcopyrite ores and then adding silver in a solution or in a solid form and acid together, and then adding microorganisms at different start and finish times in the agglomeration step.

As noted above, the applicant has carried out:

(a) column leach testing to investigate the impact of chlorides and thiourea in leach liquors on bioleaching, i.e. microorganism assisted leaching, of agglomerates of fragments of (a) chalcopyrite ores and (b) silver; and (b) reactor leach testing to investigate the impact of thiourea in leach liquors on leaching of agglomerates of fragments of (a) chalcopyrite ores and (b) silver.

The column and reactor leach tests are described in the Examples below.

1 Summary

As described above, testwork conducted by a Group company of the applicant has shown that various silver-complexing agents, including chlorides and thiourea, can be used to activate silver (as this term is described above) in, or added to, chalcopyrite ores, and hence, enhance the catalytic effect of silver in the leaching of chalcopyrite.

The testwork has shown that chlorides have a synergistic effect with silver in enhancing copper extraction from chalcopyrite-containing copper ores. This was an unexpected result, as the literature indicates that chloride in a leach liquor would in fact tend to precipitate silver, as silver chloride, and thus, reduce or eliminate the catalytic effect of silver.

The testwork has shown that thiourea is another reagent that has a synergistic effect with silver in enhancing copper extraction from chalcopyrite-containing copper ores through the activation of silver.

It is expected that other complexants, in particular other sulfur containing ligands and silver-complexing ligands, would have the same effect.

Testwork using chloride-containing and thiourea-containing liquors has been conducted in leaching columns. Testwork using thiourea-containing liquor has been conducted in small scale leaching stirred reactors.

2 Column Testwork 2.1 Experimental Procedure

Ore samples were crushed to <12 mm, with a $P_{80}$ of 9 mm and around 10 kg of this material was added to an agglomerating drum with water and concentrated acid. In tests with added silver, silver nitrate or silver sulfate was dissolved in the water used in agglomeration, and this was added as a mist, being sprayed onto the ore during agglomeration. Once mixed, the agglomerated ore was loaded into 1 m high, 0.1 m diameter columns and allowed to cure for 2-5 days at room temperature before leaching commences. During leaching, the temperature of a column was controlled at 50° C. using a heating jacket and the column was aerated at 0.102 $Nm^3/h/t$. The column was inoculated with ferrous and sulfur-oxidising microorganisms. An irrigation solution, initially containing around 15 g/L ferric iron as ferric sulfate, 5 to 7 g/L aluminium as aluminium sulfate and 0.1 to 0.5 g/L magnesium as magnesium sulfate, was pumped into the top of the column through drippers, at 10 $L/h/m^2$, and collected at the base of the column. The pH of the collected leach solution was adjusted to a target pH of 1.2, if required, before recycling back to the top of the column. If the solution copper concentration exceeded 8 g/L, due to copper leaching, the solution was subjected to ion exchange to remove copper and reduce the solution copper concentration to maintain it at less than 8 g/L. The irrigation solution had a total sulfate concentration of between 20 and 80 g/L at the beginning of the leach. If the total sulfate concentration in solution exceeded 120 g/L, due to the addition of sulfuric acid as a consequence of the leaching of gangue minerals, or the oxidation of sulfide minerals, the solution was diluted to maintain a maximum sulfate concentration of 120 g/L. When used, sufficient chloride to achieve a solution concentration of 1 g/L was added to the leach solution as lithium chloride, or sufficient thiourea to achieve a solution concentration of 1 g/L was added to the leach solution.

The composition of the ore used is shown in Table 1. The copper was predominantly present as chalcopyrite. The ore contained 0.5 g Ag/kg Cu as naturally occurring silver.

Figure 3:
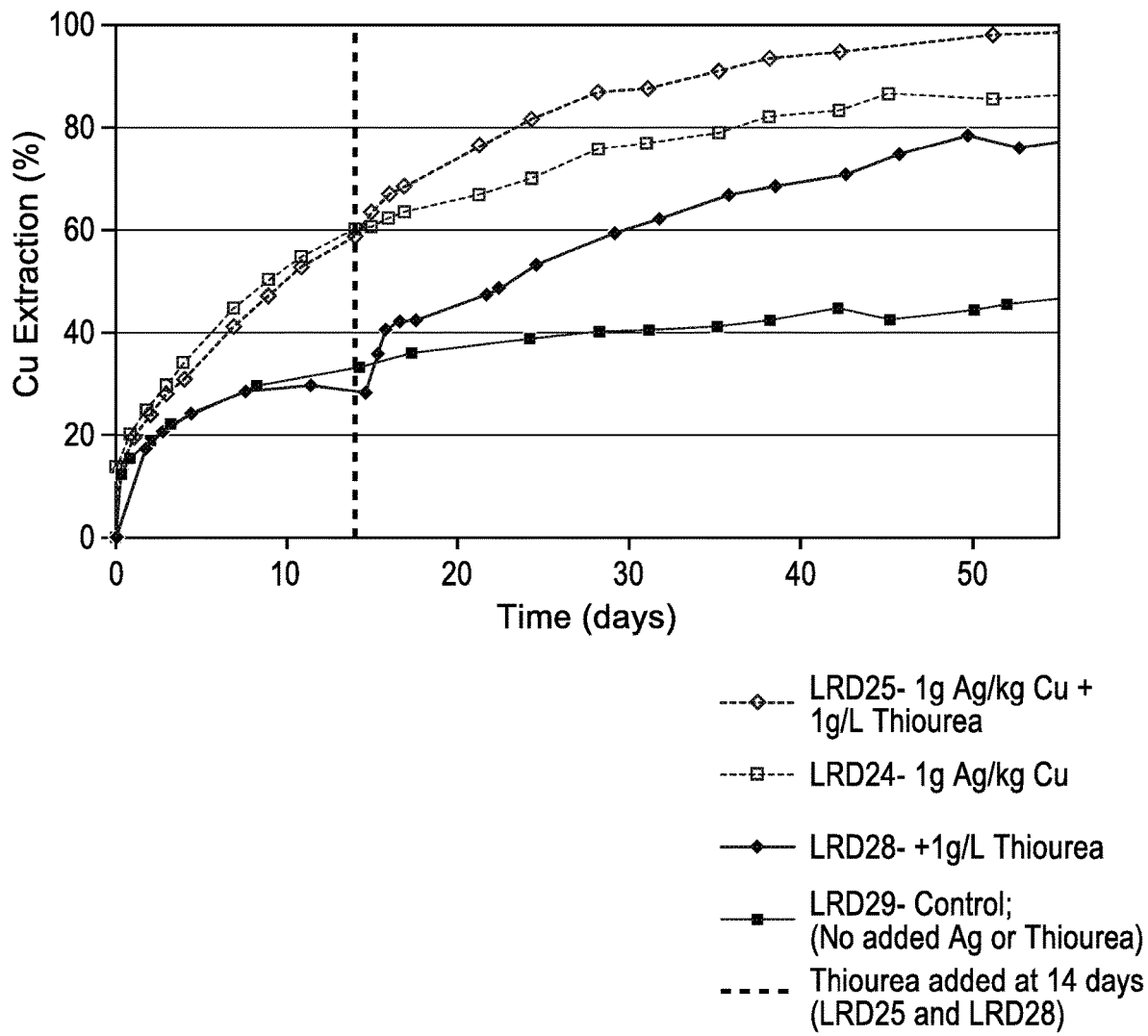
FIGS. 3 and 4 are graphs that show copper extraction profiles for chalcopyrite-containing ores for copper leach extractions with thiourea and/or silver addition.

3 Stirred Reactor Testwork—FIG. 3

3.1 Experimental Procedure

Stirred reactor tests were conducted on ore samples that were crushed to −2 mm and agglomerated with 2 kg/t sulfuric acid and the added silver, if being used. The agglomerated ore samples were left to cure for two days prior to being mixed with sufficient solution containing 80 g/L sulfate (liquor composition as described in Section 2.1) to achieve a 10% slurry. This slurry was stirred, and was maintained at 50° C. in a water bath, with the pH and $E_h$ controlled to 1.2 and 700 mV, respectively.

In selected tests, sufficient thiourea to achieve a solution concentration of 1 g/L was added to the leach slurry after two weeks of leaching.

The ore sample used for these tests was the same as in Table 1.

3.2 Impact of Thiourea with Silver

FIG. 3 shows copper extraction profiles for the copper leach extraction with thiourea and/or silver addition during a 50 days period. The addition of 1.0 g Ag/kg Cu in agglomeration clearly benefited copper extraction (LR024) compared to the control test where neither silver nor thiourea was added (LR029). Addition of 1 g/L thiourea after two weeks of leaching also benefited copper extraction (LR028). The highest copper extraction was achieved when both 1.0 g Ag/kg Cu silver and 1 g/L thiourea were added to the leach (LR025)—approximately 98%, compared with approximately 85%, 78% and 45% with silver, chloride, and the control, respectively after the same time period.

Figure 4:
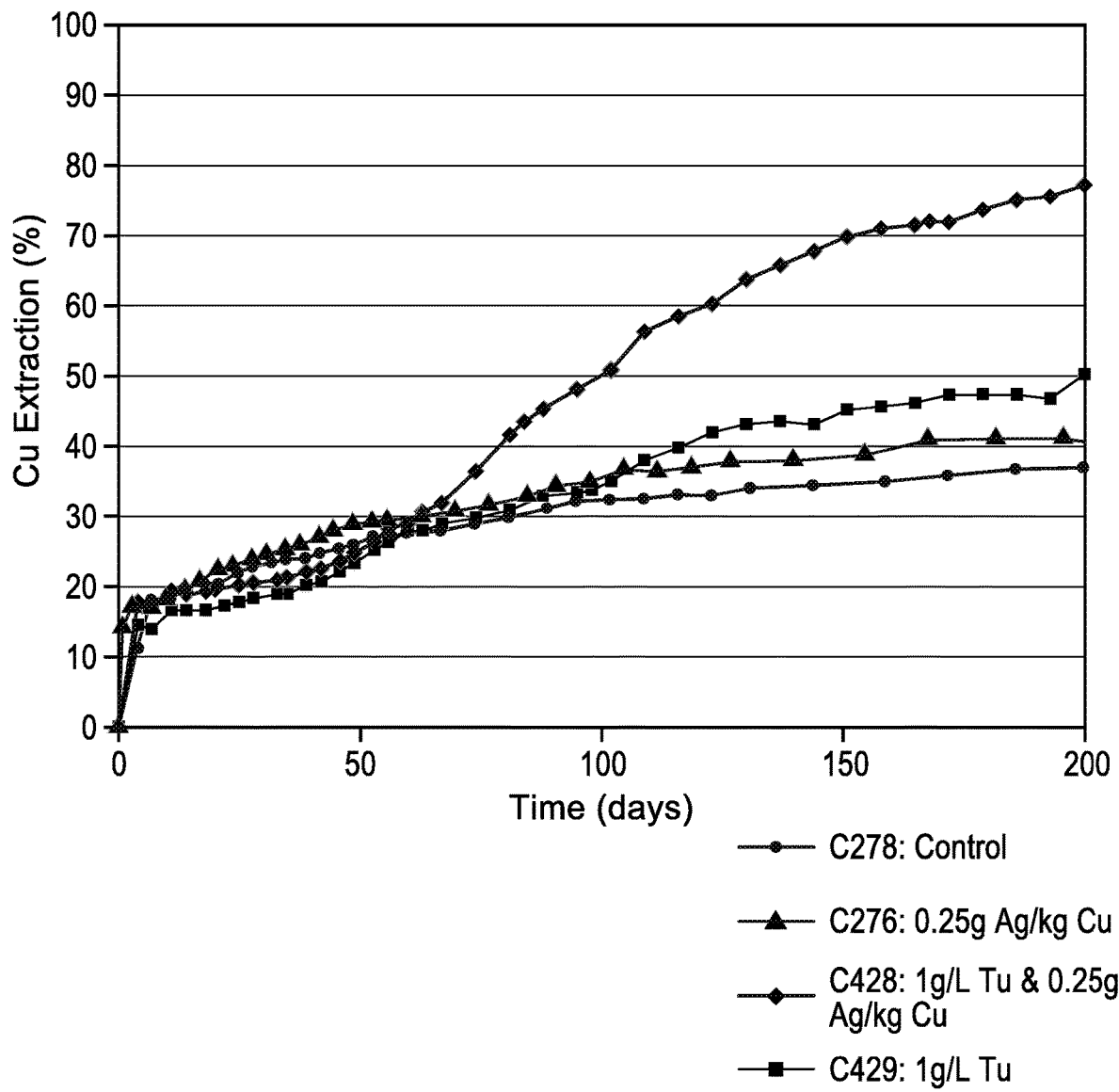

4 Column Testwork—FIG. 4

4.1 Experimental Procedure

Figure 2:
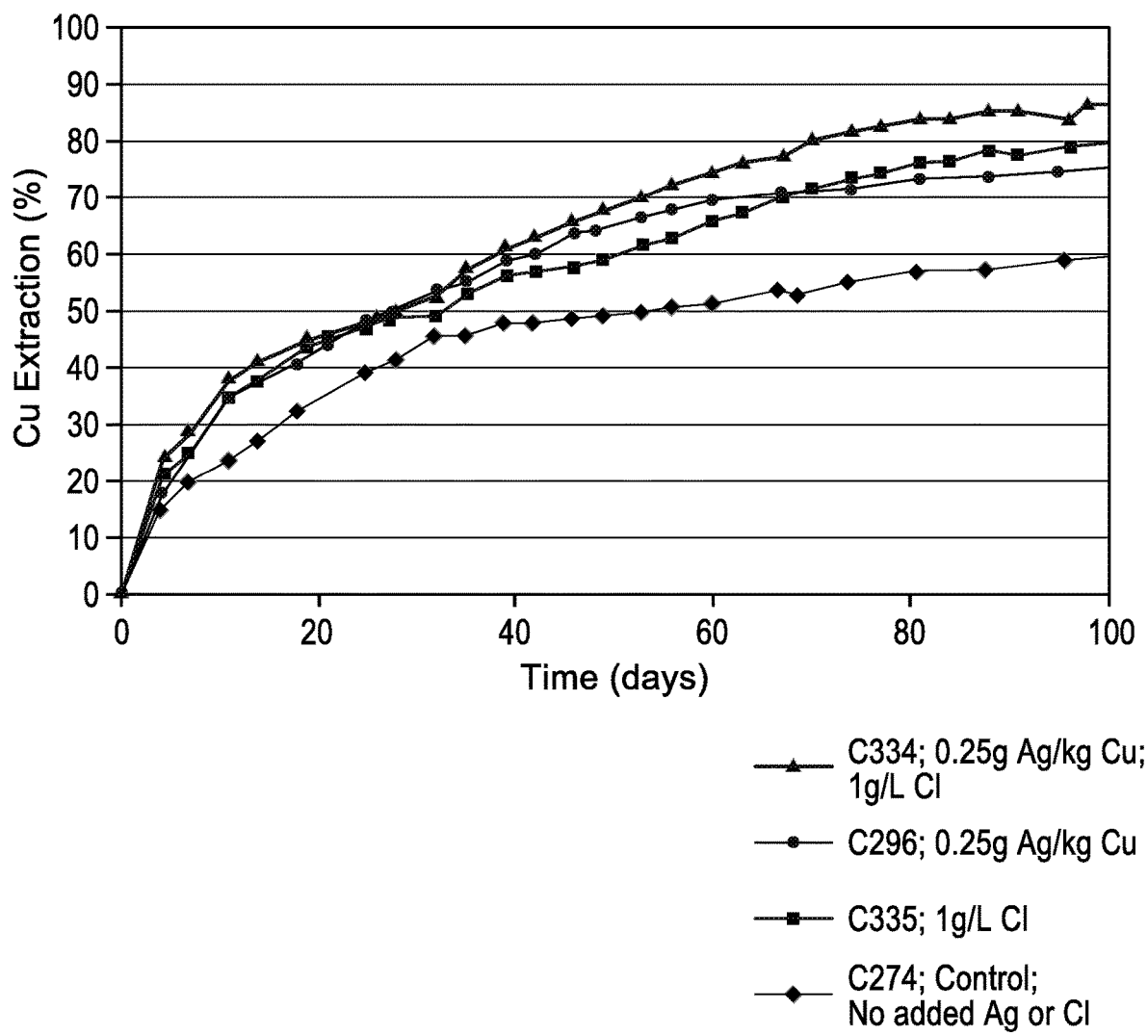
FIG. 2 is a graph that depicts copper extraction profiles for chalcopyrite-containing ores for a copper leach extraction with chloride addition and/or silver addition.

The experimental procedure used to generate the results depicted in FIG. 4 is the same as FIG. 2, except that thiourea replaced chloride, a lower initial sulfate solution was used, 20 g/L sulfate (made up with ferric sulfate), and a lower temperature was used, 30° C.

The ore sample used for these tests was the same as that summarized in Table 1.

4.2 Impact of Thiourea with Silver

FIG. 4 shows that addition of either 0.25 g Ag/kg Cu (to the ore in agglomeration, C276) or 1 g/L thiourea (to the

TABLE 1

Ore Composition

| Cu (%) | Fe (%) | As (%) | Ag (ppm) | $S_{SO4}$ (%) | $S_T$ (%) | $CuFeS_2$ (%) | CuS (%) | $Cu_2S$ (%) | Cu Arsenides (%) |
|---|---|---|---|---|---|---|---|---|---|
| 1.30 | 5.0 | 0.1 | 7 | 0.55 | 5.4 | 2.4 | 0.25 | 0.05 | 0.38 |

2.2 Impact of Chloride Addition with Silver—FIG. 2

FIG. 2 shows copper extraction profiles obtained when the ore was leached at 50° C. with a solution having an initial sulfate concentration of 80 g/L. The figure shows that addition of either 0.25 g Ag/kg Cu (to the ore in agglomeration, C296) and/or 1 g/L chloride (to the leach solution, C335) significantly accelerated copper extraction compared to the control test where neither silver nor chloride was added (C274). However, after 100 days, the addition of both 0.25 g Ag/kg Cu and 1 g/L chloride (C334) gave the highest copper extraction, with approximately 87% extraction after 100 days—compared with approximately 80%, 75% and 60% with chloride, silver, and the control, respectively after the same time period.

leach solution, C429) only slightly improves copper extraction compared to the control test where neither silver nor thiourea was added (C278)—50%, 40% and 37% with thiourea, silver, and the control, respectively after the same time period. However, the addition of both 0.25 g Ag/kg Cu and 1 g/L thiourea (C428) gave the highest copper extraction—approximately 78%. This extraction improvement is significantly above the additive impacts of these additives.

It is evident from the results of the testwork reported in FIGS. 2-4 that the combinations of silver/chloride and silver/thiourea greatly improved leaching of chalcopyrite ores.

Many modifications may be made to the embodiment of the present invention described above without departing from the spirit and scope of the invention.

By way of example, the embodiment is described in relation to FIG. 1 as a series of successive steps with fragments being transferred directly to the agglomeration station 3 and thereafter directly to form a heap 5. The invention is not limited to this embodiment and there may be stockpiling of agglomerates after the station 3. In addition, the station 3 and the heap 5 may not be located in the same area and it may be necessary to transport agglomerates between station 3 and heap 5 that are in different locations.

By way of further example, whilst the embodiment is described in relation to FIG. 1 in the context of mixing ore fragments and silver and forming agglomerates of ore fragments and silver and then forming heaps of the agglomerates, the invention is not so limited and extends to mixing run-of-mine ore and silver and then forming heaps from the run-of-mine ore.

By way of further example, whilst the embodiment is described in relation to FIG. 1 in the context of forming agglomerates by mixing together ore fragments and silver in the agglomeration step, the invention also extends to the following options:

(a) forming agglomerates by adding silver to ore fragments and then mixing together ore fragments in an agglomeration step; and (b) forming agglomerates of ore fragments in an agglomeration step and then adding silver to the agglomerates.

By way of further example, whilst the embodiment is described in relation to FIG. 1 in the context of forming agglomerates by mixing together ore fragments, silver, acid, and microorganisms in an agglomeration step, the invention is not limited to forming agglomerates with acid and microorganisms. In other words, acid and microorganisms are optional additions in the agglomerates.

The invention claimed is:

1. A method of leaching copper-containing ores with a leach liquor including:
    (a) forming agglomerates by a step selected from (i) mixing together ore fragments and silver in an agglomeration step, (ii) adding silver to ore fragments and then mixing together ore fragments in an agglomeration step, or (iii) forming agglomerates in an agglomeration step and then adding silver to the agglomerates, with the agglomerates having a low added silver concentration of less than 5 g silver per kg copper in the ore in agglomerates, and
    (b) leaching agglomerates in the presence of an activation agent that activates silver whereby the silver enhances copper extraction from copper ores, with the activation agent being in the form of any one or more than one of chlorides, iodides, bromides, and thiourea.

2. The method defined in claim 1 wherein the leaching is selected from the group consisting of heap, vat, and tank leaching.

3. The method defined in claim 1 includes providing a selected concentration or concentration range of the activation agent in the leach liquor.

4. The method defined in claim 3 wherein the selected concentration or concentration range of the activation agent in the leach liquor results from any one or more of the following positive steps:
    (a) addition of the activation agent to the leach liquor;
    (b) removal of the activation agent from the leach liquor;
    (c) addition of the activation agent in the agglomeration step;
    (d) mixing different ore types having regard to the activation agent in the ores;
    (e) selection and mixing/blending of water source/type regard to the activation agent in the ores; and
    (f) other human-intervention into one or more inputs to the method of leaching that can affect the activation agent concentrations in the method of leaching.

5. The method defined in claim 1 wherein the leaching is carried out in the presence of a low concentration or concentration range of the activation agent.

6. The method defined in claim 5 wherein the leaching is carried out in the presence of a low concentration of chlorides, iodides, and bromides of up to 5 g/L in the leach liquor.

7. The method defined in claim 6 wherein the low concentration of chlorides is greater than 0.8 g/L.

8. The method defined in claim 5 wherein the leaching is carried out in the presence of a low concentration of chlorides of greater than 0.2 g/L.

9. The method defined in claim 5 wherein the leaching is carried out in the presence of a low concentration of thiourea of less than 10 g/L in the leach liquor.

10. The method defined in claim 5 wherein the low concentration of chlorides, iodides and bromides is up to 4 g/L in the leach liquor.

11. The method defined in claim 1 includes adding the activation agent to the leach liquor during the method to maintain a required concentration.

12. The method defined in claim 1 includes leaching a heap of agglomerates with the leach liquor.

13. The method defined in claim 12 wherein heap leaching includes bioleaching with microorganisms to assist leaching of copper.

14. The method defined in claim 12 wherein heap leaching includes controlling heap temperature to be less than 85° C.

15. The method defined in claim 12 includes controlling oxidation potential of the leach liquor during an active leaching phase of heap leaching to be less than 900 mV versus a standard hydrogen electrode.

16. The method defined in claim 12 includes recovering copper from the leach liquor in downstream copper recovery steps.

17. The method defined in claim 16 includes regenerating the leach liquor and recycling the regenerated leach liquor to the heap of agglomerates.

18. The method defined in claim 12 wherein heap leaching includes controlling the heap temperature to be less than 50° C.

19. The method defined in claim 1 wherein the added silver concentration in agglomerates is less than 2 g silver per kg copper in the ore in agglomerates.

20. The method defined in claim 1 wherein the added silver concentration in agglomerates is less than 1 g silver per kg copper in the ore in the agglomerates.

21. The method defined in claim 1 wherein the added silver concentration in agglomerates is less than 0.5 g silver per kg copper in the ore in the agglomerates.

22. The method defined in claim 1 wherein added silver concentration in agglomerates is greater than 0.02 g silver per kg copper in the ore in agglomerates.

23. The method defined in claim 22 wherein the added silver concentration in agglomerates is greater than 0.2 g silver per kg copper in the ore in agglomerates.

24. The method defined in claim 1 includes steps (a)(i) or (a)(ii) and comprises adding the silver in a solution or in a solid form to chalcopyrite ore fragments.

25. The method defined in claim 1 includes forming agglomerates by also mixing microorganisms that can assist leaching of copper.

26. The method defined in claim 1 includes steps (a)(i) or (a)(ii) and comprises adding the silver in a spray or a mist to chalcopyrite ore fragments.

27. The method defined in claim 1 includes steps (a)(i) or (a)(ii) and comprises adding the silver in an aerosol to chalcopyrite ore fragments.

28. A method of leaching copper-containing ores that includes:
   (a) forming agglomerates of fragments of (i) a copper-containing ore, (ii) silver, (iii) an acid, and (iv) optionally microorganisms, wherein the agglomerate forming step includes any one of (i) mixing together ore fragments and added silver in an agglomeration step, (ii) adding silver to ore fragments and then mixing together ore fragments in an agglomeration step, and (iii) adding silver to the agglomerates after the agglomerates have been formed, and wherein the added silver concentration in the agglomerates is less than 1 g silver per kg copper in the ore in the agglomerates;
   (b) forming a heap of the agglomerates;
   (c) leaching the agglomerates in the heap with a leach liquor in the presence of an activation agent that activates silver whereby the silver enhances copper extraction, with the activation agent being any one or more than one of chlorides, iodides, bromides, and thiourea; and
   (d) recovering copper from the leach liquor.

29. A method of leaching copper-containing ores that includes:
   (a) forming agglomerates of fragments of (i) a copper-containing ore, (ii) an acid, (iii) optionally silver, and (iv) optionally microorganisms, wherein when addition of silver is required, the agglomerate forming step includes any one of (i) mixing together ore fragments and added silver in an agglomeration step, (ii) adding silver to ore fragments and then mixing together ore fragments in an agglomeration step, and (iii) adding silver to the agglomerates after the agglomerates have been formed, wherein the amount of added silver is determined by taking into account catalyst properties for copper leaching of naturally occurring silver in the ore, and wherein the added silver concentration in the agglomerates is less than 1 g silver per kg copper in the ore in the agglomerates;
   (b) forming a heap of the agglomerates;
   (c) leaching the agglomerates in the heap with a leach liquor in the presence of an activation agent that activates silver whereby the silver enhances copper extraction, with the activation agent being any one or more than one of chlorides, iodides, bromides, and thiourea; and
   (d) recovering copper from the leach liquor.

* * * * *